(12) United States Patent
Bolloni

(10) Patent No.: US 7,511,841 B2
(45) Date of Patent: Mar. 31, 2009

(54) ATTACHMENT PRINTING OF DOCUMENTS

(75) Inventor: Alexander Bolloni, Angelbachtal (DE)

(73) Assignee: SAP Aktiengesellschaft, Walldorf (DE)

( * ) Notice: Subject to any disclaimer, the term of this patent is extended or adjusted under 35 U.S.C. 154(b) by 909 days.

(21) Appl. No.: 10/366,641

(22) Filed: Feb. 12, 2003

(65) Prior Publication Data
US 2004/0156072 A1 Aug. 12, 2004

(51) Int. Cl.
G06F 3/12 (2006.01)
G06F 15/16 (2006.01)
G06F 17/00 (2006.01)

(52) U.S. Cl. .............. 358/1.15; 358/1.1; 709/206; 709/217; 715/200; 715/203

(58) Field of Classification Search ........... 358/1.15, 358/1.2, 1.1; 709/206, 217; 715/500, 503, 715/200, 203
See application file for complete search history.

(56) References Cited

U.S. PATENT DOCUMENTS 7,002,707 B2 * 2/2006 Kujirai ................. 358/1.9
2002/0075506 A1 * 6/2002 Stevenson et al. ........ 358/1.15

* cited by examiner

Primary Examiner—Edward L Coles
Assistant Examiner—Thomas J Lett
(74) Attorney, Agent, or Firm—Fish & Richardson P.C.

(57) ABSTRACT

Methods and apparatus, including computer program products, for attachment printing of documents. The method includes, in a network, receiving an output request of a document, the document including associated attachment documents, generating a composite spool request containing child spool requests representing the document and associated attachment documents, and converting the converting the child spool requests into a sequence of printable format data streams.

12 Claims, 3 Drawing Sheets

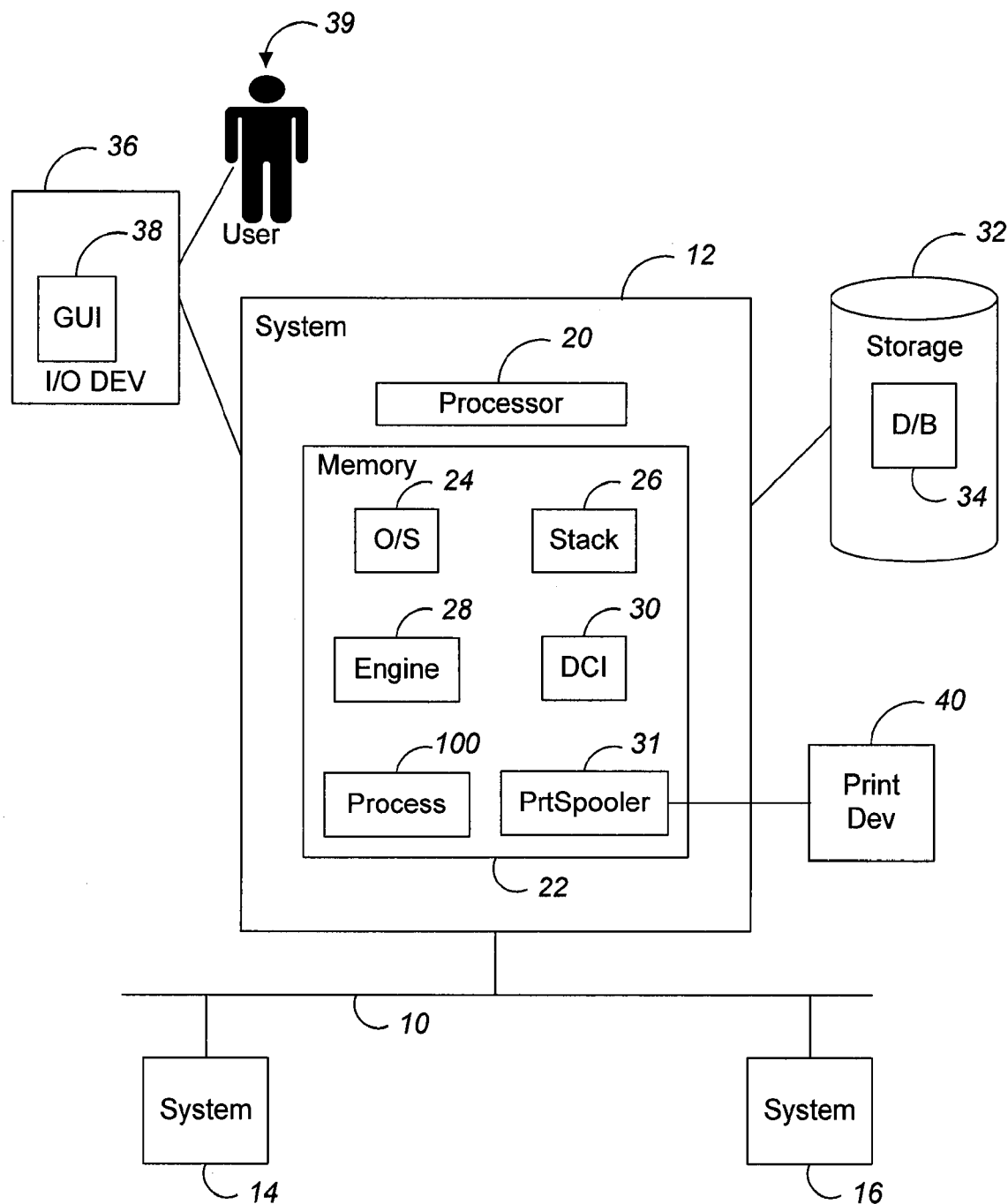
FIG._1

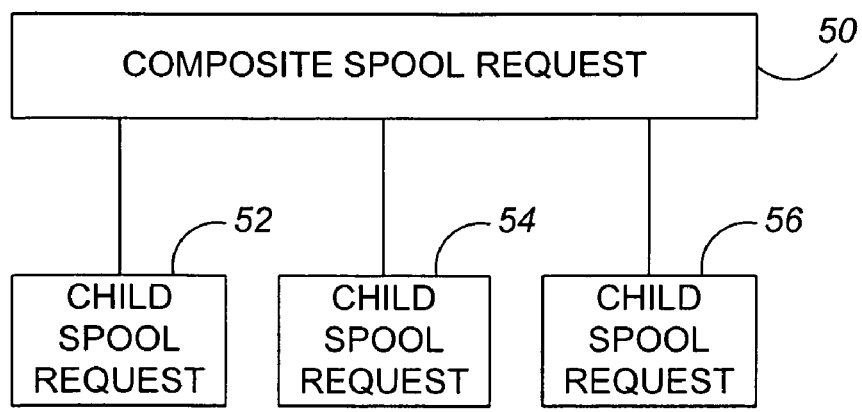
FIG._2
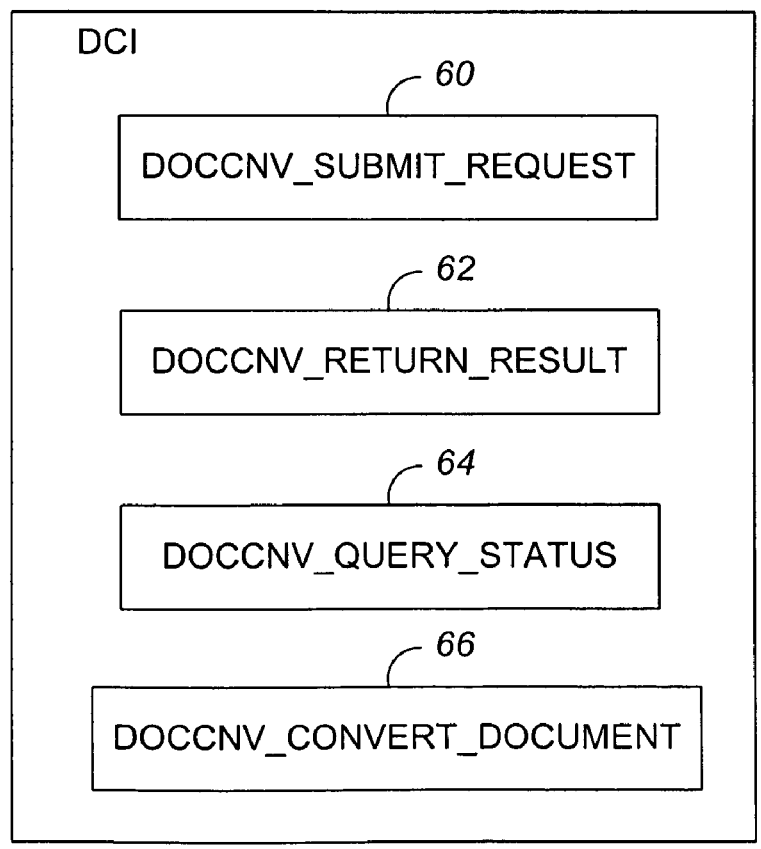
FIG._3

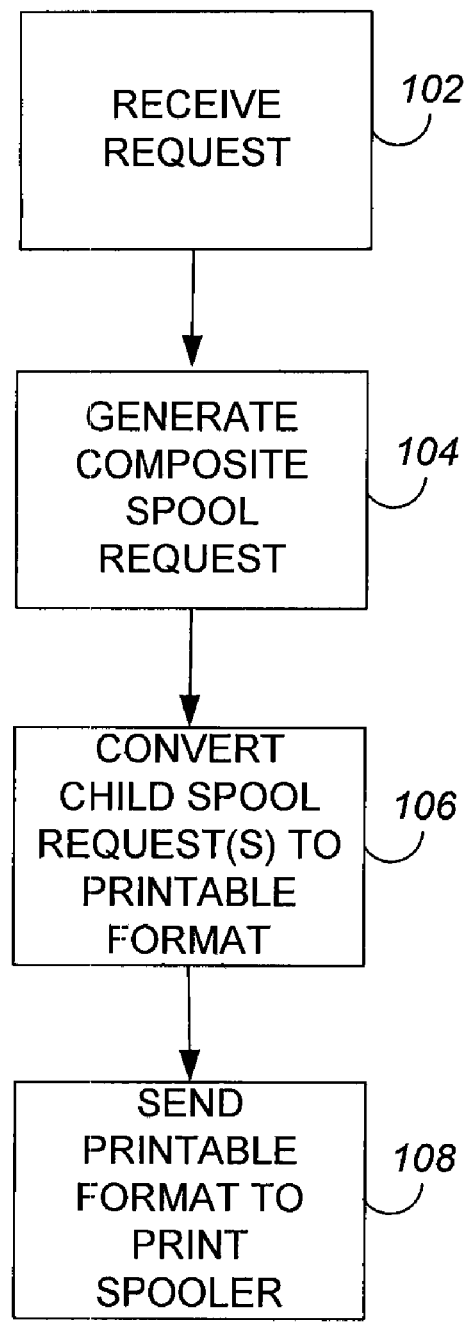
FIG._4

ATTACHMENT PRINTING OF DOCUMENTS

BACKGROUND

The present invention relates to data processing by digital computer, and more particularly to attachment printing of documents.

In collaborative business processes, several different and separate computer based systems are typically involved, such as in Enterprise Resource Planning (ERP) systems. These systems communicate with each other using a network, thus forming a computer system landscape. Within such a system landscape data is exchanged between and replicated in the systems involved, and documents are printed at the request of users.

SUMMARY OF THE INVENTION

The present invention provides methods and apparatus, including computer program products, for printing documents and associated attachments in a distributed system landscape.

In general, in one aspect, the invention features a method including, in a network, receiving an output request of a document, the document including associated attachment documents, generating a composite spool request containing child spool requests representing the document and associated attachment documents, and converting the converting the child spool requests into a sequence of printable format data streams.

The invention can be implemented to include one or more of the following advantageous features. The method can include passing the sequence to a print spooler for delivery to an output device.

In particular implementations, one of the child spool requests can be a second composite spool request containing additional child spool requests. The document and associated documents can be in a single format such as a word processing, word presentation or spread sheet format. The document and associated documents can be in different formats.

In particular implementations, the printable format can be PostScript or PCL 5.

In general, in another aspect, the invention features a method of outputting documents and related attachments. The method includes receiving an output request of a document, identifying related documents associated with the document, generating a composite spool request containing child spool requests representing the document and associated related documents, and converting the child spool requests into a sequence of printable format data streams.

In particular implementations, one of the child spool requests can be a second composite spool request containing additional child spool requests. The document and related documents can be in a single format such as a word processing, word presentation or spread sheet format. The document and related documents can be in different formats.

The invention can be implemented to realize one or more of the following advantages.

A user in an ERP system can print a system-generated document in a single print job, such as an invoice or order confirmation, plus one or more attachments that belong to the business document. No other printouts, i.e., printed pages, occur between the business document and the attachments. The output is submitted to the printer as a single print job. Thus, the relationship between the business document and its respective attachments is preserved.

Attachments can include personal computer (PC) generated documents, such as those generated by Microsoft Office applications like Microsoft Word®, Microsoft PowerPoint® and Microsoft Excel®.

A single parent spool request (also referred to as a composite request) is generated that includes several child spool requests. The child spool requests contain the business document and one or more of the PC documents to be printed. For each child document in the composite spool request, an external document converter is called that converts the PC document into a printable format, such as PostScript or PCL 5. For each PC document contained in the composite spool request, the external converter returns printable format to the ERP system and the ERP system generates a single print job including a sequence of all printable format data streams that are then sent to a printer device. The invention can be implemented in systems other than ERP systems.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 1 is block diagram of a landscape.

FIG. 2 is a block diagram of a parent spool request and associated child spool requests.

FIG. 3 is a block diagram of the document conversion interface of FIG. 1

FIG. 4 is a flow diagram of the print process of FIG. 1.

Like reference numbers and designations in the various drawings indicate like elements.

DETAILED DESCRIPTION

FIG. 1 illustrates an exemplary network 10, also referred to as a landscape, which includes a number of collaborating systems 12, 14, 16. Each of the systems 12, 14, 16, system 12 for example, includes a processor 20 and a memory 22. Memory 22 stores an operating system 24, a stack 26 for communicating over the network 10, an engine 28 that works on data associated with a database through the execution of different types of applications, a document converter interface 30 and a print process 100, described below, that is linked to a print spooler 31. Communication among the document converter interface (DCI) 30, and the print spooler 31 can be by any suitable means, e.g., by use of a remote process invocation or remote messaging facility. In particular, the Remote Function Call (RFC) functionality of R/3 systems available from SAP AG of Walldorf (Baden) Germany can be used.

Each of the systems 12, 14, 16—system 12 for example—includes a storage device 32 having a database 34 that can be, for example, maintained by a database management system. System 12 can also include an input/output (I/O) device 36 for display of a graphical user interface (GUI) 38 to a user 39. System 12 also includes a printing device 40 associated with a print spooler 31.

The systems 12, 14, 16 can be of any type, e.g., Enterprise Resource Planning (ERP) systems. In general, ERP is an industry term for a broad set of activities supported by multi-module application software that helps a manufacturer or other business manage important parts of its business, including product planning, parts purchasing, maintaining inventories, interacting with suppliers, providing customer service, and tracking orders. ERP can also include application modules for finance and human resources aspects of a business.

Typically, an ERP system uses or is integrated with a database management system. An example of an ERP system is the integrated business solution mySAP.com from SAP AG.

In an ERP system, business processes are commonly modeled in business objects. Instances of the business object are represented in data generated, stored and manipulated by the system. Typically, the systems that form part of the landscape each include a database, as discussed above, in which data related to instances of the business objects are stored.

From time to time, the user 39—and for purposes of exposition, the user will be assumed to be on an ERP system—requests a print of a document and associated attachments on the printer 40. In response to a user print command, a single parent spool request (which will also be referred to as a composite request) is generated that includes several child spool requests. The child spool requests contain the document requested by the user and one or more attachments associated with the document. For each child PC document in the composite spool request, an external document converter is called that converts the PC document into a printable format, such as PostScript or PCL 5. For each PC document contained in the composite spool request, the external converter returns printable format to the ERP system and the ERP system generates a single print job including a sequence of all printable format data streams that are then sent to a printer device.

As shown in FIG. 2, the print command of a document generates a parent spool request 50, also referred to as a master spool request or composite spool request, representing the document and associated documents to be printed. In this example, the composite spool request 50 includes child spool requests 52, 54, 56, representing, respectively, the document to be printed and two attachments associated with the document. In another example, child spool request 52 represents a second composite spool request (not shown) that includes additional child spool requests (not shown).

For each child spool request 52, 54, 56, the document converter interface 30 is called. The document converter interface 30 converts the contents of each child spool request, i.e., document or attachment, into a printable format. Example printable formats are PostScript, developed by Adobe Incorporated, and PCL (Hewlett-Packard Printer Control Language) 5. For each child spool request 52, 54, 56, the document converter interface 30 returns the printable format to the print spooler as a single print job including a sequence of all printable format data streams that is subsequently sent to the printing device 40. The composite spool request 50 contains no data except a list of associated child spool requests 52, 54, 56.

As shown in FIG. 3, one implementation of the document converter interface 30 includes a set of ABAP functions 60, 62, 64, 66. ABAP is a programming language for developing applications for the widely-installed SAP R/3 system.

Function 60 (DOCCNV_SUBMIT_REQUEST) handles delivery of the documents and attachments to the document converter interface 30. Function 62 (DOCCNV_RETURN_RESULT) handles return of the converted documents and attachments from the document converter interface 30 to the print spooler 31. Function 64 (DOCCNV_QUERY_STATUS) handles a status demand from the system 12 ordering a conversion. Function 66 (DOCCNV_CONVERT_DOCUMENT) handles synchronous conversion of an individual document.

Function 60 (DOCCNV_SUBMIT_REQUEST) includes three parameters that can be implemented as structures. A first parameter CNVPARAMS contains global parameters, which steer the conversion, including an identification order. Example parameters are spool request, SAP release, target format, office device type, username, names of children, page format and so forth.

A second parameter DOCSINFO includes, for every document that can be converted, the document format (e.g., DOC, PPT, XLS), as well as the length in bytes. A third parameter DOCSDATA includes the contents of all DOCSINFO listed documents according to offset and length specifications from table DOCSINFO.

Function 62 (DOCCNV_RETURN_RESULT) includes three parameters that can be implemented as structures. A first parameter CNVRESULT contains the identification order, which document was converted, as well as status code and global error messages concerning the complete conversion procedure. A second parameter DOCSINFO includes, for each converted child document, its spool number, the length of the converted data in bytes, a conversion status, as well as any error messages. A third parameter DOCSDATA includes the contents of all DOCSINFO listed documents after conversion (one behind the other, byte by byte, without gaps or at the beginning of and/or end marking).

Function 64 (DOCCNV_QUERY_STATUS) includes a parameter that identifies a spool number, over whose conversion status information is desired.

Function 66 (DOCCNV_CONVERT_DOCUMENT) includes three parameters that can be implemented as structures. A first parameter includes parameters that steer the conversion. A second parameter DOCSDATA includes contents of the document that can be converted and with the completion of the RFC call of the external converter with the converted data is filled. A third parameter CNVRESULT includes a conversion status as well as possible error messages.

The document conversion interface 30 can be easily adapted to a variety of print and/or graphic formats.

In FIG. 4, print process 100 includes receiving (102) a user request to print a document and associated attachments. The process 100 generates (104) a composite spool request. The composite spool request includes child spool requests representing the requested document and associated attachments. The process 100 converts (106) the child spool requests representing the document and associated attachments into a sequence of printable data streams and sends (108) the sequence to a print spooler.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims.

What is claimed is:

1. A method comprising:
   receiving from a user of a computer-based system a request to print a system-generated output document that includes one or more associated attachment documents, wherein the system has a document converter interface and a print spooler;
   generating, in the system in response to the user print request, a composite spool request that includes a child spool request for the output document and a separate child spool request for each of the one or more associated attachment documents, wherein the composite spool request represents the output document and the associated documents to be printed, and each child spool request represents a respective one of the documents, either the output document or one of the one or more associated attachment documents;
   calling the document converter interface for each of the child spool requests to call an external document converter to convert the document represented by the respective child spool request into a printable format and to return the printable format data to the system, wherein the document converter interface includes a plurality of functions that handle delivery of the output document and associated attachment documents to the document converter interface, that handle return of converted documents and attachments, that handle a conversion status demand, and that handle synchronous conversion of an individual document;
   generating in the system a single print job, the single print job including a sequence of all the printable format data returned to the system by the external document converter for the child spool requests; and
   sending the single print job to the print spooler, the print spooler delivering the single print job to a printer device.

2. The method of claim 1 wherein the output document and associated documents are in a single format.

3. The method of claim 1 wherein the output document and associated documents are in different formats.

4. The method of claim 1 wherein the printable format is PostScript.

5. The method of claim 1 wherein the printable format is PCL 5.

6. The method of claim 2 wherein the single format is a word processing format.

7. The method of claim 2 wherein the single format is a word presentation format.

8. The method of claim 2 wherein the single format is a spreadsheet format.

9. A computer-based system, comprising:
   a processor, a user interface, a document converter interface and a print spooler;
   wherein the system:
   receives, from a user through the user interface, a request to print a system-generated output document and that includes one or more associated attachment documents;
   generates, in response to the user print request, a composite spool request that includes a child spool request for the output document and a separate child spool request for each of the one or more associated attachment documents, wherein the composite spool request represents the output document and the associated documents to be printed, and each child spool request represents a respective one of the documents, either the output document or one of the one or more associated attachment documents;
   calls the document converter interface for each of the child spool requests to call an external document converter to convert the document represented by the respective child spool request into a printable format and to return the printable format data to the system, wherein the document converter interface includes a plurality of functions that handle delivery of the output document and associated attachment documents to the document converter interface, that handle return of converted documents and attachments, that handle a conversion status demand, and that handle synchronous conversion of an individual document;
   generates in the system a single print job, the single print job including a sequence of all the printable format data returned to the system by the external document converter for the child spool requests; and
   sends the single print job to the print spooler, the print spooler delivering the single print job to a printer device.

10. The system of claim 9 wherein the composite spool request contains no data except a list of associated child spool requests.

11. The system of claim 9 wherein the output document and associated documents are in different formats.

12. The system of claim 9 wherein the system:
    generates a child spool request that represents a distinct composite spool request that includes additional child spool requests.

* * * * *